(12) United States Patent
Ge et al.

(10) Patent No.: US 10,946,584 B2
(45) Date of Patent: Mar. 16, 2021

(54) PARTICULATE BUILD MATERIAL

(71) Applicant: Hewlett-Packard Development Company, L.P., Houston, TX (US)

(72) Inventors: Ning Ge, Palo Alto, CA (US); James Elmer Abbott, Jr., Corvallis, OR (US); Steven J Simske, Ft. Collins, CO (US); Paul J Benning, Corvallis, OR (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 16/071,018

(22) PCT Filed: Apr. 11, 2016

(86) PCT No.: PCT/US2016/026993
§ 371 (c)(1),
(2) Date: Jul. 18, 2018

(87) PCT Pub. No.: WO2017/180095
PCT Pub. Date: Oct. 19, 2017

(65) Prior Publication Data
US 2019/0047215 A1 Feb. 14, 2019

(51) Int. Cl.
*B29C 64/165* (2017.01)
*B22F 3/105* (2006.01)
*B28B 1/00* (2006.01)
*B22F 1/02* (2006.01)
*B33Y 30/00* (2015.01)
(Continued)

(52) U.S. Cl.
CPC .............. *B29C 64/165* (2017.08); *B22F 1/02* (2013.01); *B22F 10/00* (2021.01); *B28B 1/001* (2013.01); *B29C 64/153* (2017.08); *B29C 67/00* (2013.01); *B33Y 30/00* (2014.12); *B33Y 70/00* (2014.12);
(Continued)

(58) Field of Classification Search
CPC ................ B22F 1/02; B22F 2003/1056; B22F 2304/10; B22F 3/1055; B22F 9/04; B28B 1/001; B29C 64/153; B29C 64/165; B29C 67/00; B33Y 30/00; B33Y 70/00
See application file for complete search history.

(56) References Cited

U.S. PATENT DOCUMENTS 6,974,656 B2   12/2005   Hinczewski
2006/0159896 A1   7/2006   Pfeifer et al.
(Continued)

FOREIGN PATENT DOCUMENTS

CN   103785860   5/2014
CN   104487221   4/2015
(Continued)

*Primary Examiner* — Jenny R Wu
(74) *Attorney, Agent, or Firm* — Thorpe, North, Western LLP

(57) ABSTRACT

The present disclosure is drawn to a particulate build material for three-dimensional printing. The particulate build material can include a plurality of particulates, wherein individual particulates include a particulate core having a photosensitive coating applied to a surface of the particulate core. The particulate core includes a metal, a ceramic, or both a metal and a ceramic. The photosensitive coating includes a polymer having a photosensitive agent suspended or attached therein.

17 Claims, 2 Drawing Sheets

(51) Int. Cl.
  B33Y 70/00 (2020.01)
  B29C 67/00 (2017.01)
  B29C 64/153 (2017.01)
  B22F 10/00 (2021.01)
  *B22F 10/10* (2021.01)
  *B22F 9/04* (2006.01)

(52) U.S. Cl.
  CPC ................ *B22F 9/04* (2013.01); *B22F 10/10* (2021.01); *B22F 2304/10* (2013.01)

(56) References Cited

U.S. PATENT DOCUMENTS

| | | |
|---|---|---|
| 2006/0251535 A1 | 11/2006 | Pfeifer et al. |
| 2007/0241482 A1 | 10/2007 | Giller et al. |
| 2008/0122141 A1 | 5/2008 | Bedal et al. |
| 2013/0011660 A1 | 1/2013 | Diekmann et al. |
| 2014/0131908 A1 | 5/2014 | Sun et al. |
| 2015/0366073 A1 | 12/2015 | Magdassi et al. |
| 2016/0023375 A1 | 1/2016 | Uram |
| 2018/0361472 A1 * | 12/2018 | Lani ........................ G04B 13/02 |

FOREIGN PATENT DOCUMENTS

| | | | |
|---|---|---|---|
| DE | 19918981 A1 * | 11/2000 | ........... B29C 64/153 |
| JP | 2005533877 | 11/2005 | |
| JP | 2006521264 | 9/2006 | |
| JP | 2007039631 | 2/2007 | |
| JP | 2014186952 | 10/2014 | |
| WO | WO-03106148 | 12/2003 | |
| WO | WO-2004073961 | 9/2004 | |
| WO | WO-2008-067496 A2 | 6/2008 | |
| WO | WO-2008067496 A2 * | 6/2008 | ................ C08J 5/00 |
| WO | WO-2015100243 | 7/2015 | |
| WO | WO-2015118533 | 8/2015 | |
| WO | WO-2015162905 | 10/2015 | |
| WO | 2015205485 | 11/2015 | |
| WO | WO-2017104234 | 6/2017 | |

\* cited by examiner

PARTICULATE BUILD MATERIAL

BACKGROUND

Three-dimensional (3D) printing is a growing and evolving technology. For example, designers and manufacturers utilize 3D printing to create prototypes. Laboratories utilize 3D printing in tissue engineering research. The automotive, aviation, and aerospace industries utilize 3D printing for fit and finish checks on parts and to create functional parts. In order to meet the demands of these and other users, three-dimensional printers come in a wide variety of formats and utilize several processes, i.e. extrusion, photo-polymerization, binding of granular materials, laminating, metal wire processing, continuous liquid interface production. As this area of printing continues to grow and evolve, new 3D printing materials are being developed.

DETAILED DESCRIPTION

Three-dimensional printing can utilize different materials. In 3D printing involving powder or particulate sintering, a ceramic and/or a metal material can form a powder base. Utilizing ceramic and/or metal materials during the binding process can create high quality 3D printed objects. However, the use of these materials has also has drawbacks. Utilizing a ceramic and/or metal material base in 3D printing can be expensive. In addition, sintering of ceramic and/or metal materials into a 3D article can result in a low throughput.

In one example, the present disclosure is drawn to a particulate build material, including a plurality of particulates. Individual particulates can include a particulate core having a photosensitive coating applied to a surface of the particulate core. The particulate core can include a metal, a ceramic, or both a metal and a ceramic. The photosensitive coating can include a polymer having a photosensitive agent suspended or attached therein.

In another example, a method of making a particulate build material can include preparing a photosensitive coating by suspending from 0.1 wt % to 20 wt % photosensitive agent within a polymer, and applying the photosensitive coating at a coating thickness of from 5 nm to 500 nm to a plurality of particulates. Individual particulates include a particulate core including a metal, a ceramic, or a combination of a metal and a ceramic. In one example, the method can include milling the plurality of particulates before coating with the photosensitive coating. If more than one type of core is used, the plurality of particulates may include both metal and ceramic particles coated such that when applying the photosensitive coating, the metal and ceramic are within a common coating, within separate coatings, or both.

In another example, a system for three-dimensional printing can include a particulate build material for three-dimensional printing and a photo energy source to emit photo energy to the particulate build material. The particulate build material can include a plurality of particulates, wherein individual particulates include a particulate core having a photosensitive coating applied to a surface of the particulate core. The particulate core can include a metal, a ceramic, or both a metal and a ceramic. The photosensitive coating can include a polymer having a photosensitive agent suspended or attached therein. The photosensitive agent can absorb energy corresponding to a frequency of the photo energy such that the photosensitive agent causes the polymer to soften and adhere to adjacent particulates.

Figure 1:
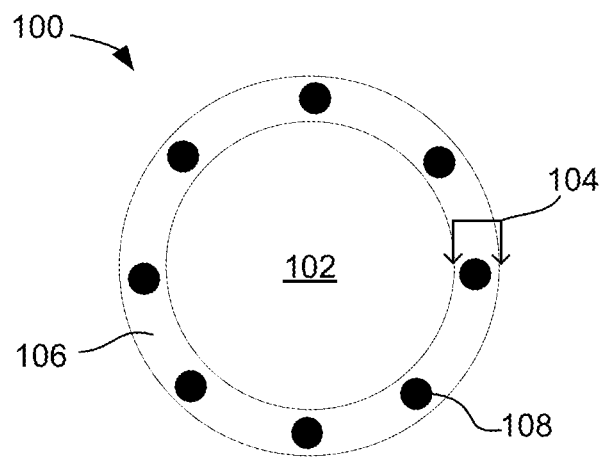
FIG. 1 schematically displays one example of a particulate build material for three-dimensional printing in accordance with examples of the present disclosure.

Referring now more specifically to the particulate build material for 3D printing. As schematically shown in FIG. 1, the particulate build material 100, can include a particulate core 102 with a photosensitive coating 104 applied to the particulate core. The photosensitive coating can include a polymer 106 with a photosensitive agent 108 suspended therein. The particulate core can be a single particle as shown in FIG. 1, or of a plurality of smaller particles.

Figure 2:
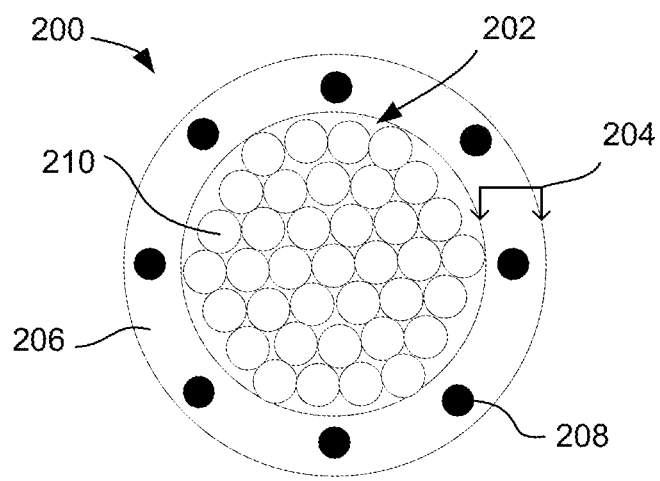
FIG. 2 schematically displays another example of a particulate build material for three-dimensional printing in accordance with examples of the present disclosure.

FIG. 2 displays one such example. In FIG. 2, a particulate build material for 3D printing 200, includes a particulate core 202 which includes a plurality of smaller particles 210. The particulate core is surrounded by a photosensitive coating 204 including a polymer 206 with a photosensitive agent 208 suspended therein.

Figure 3:
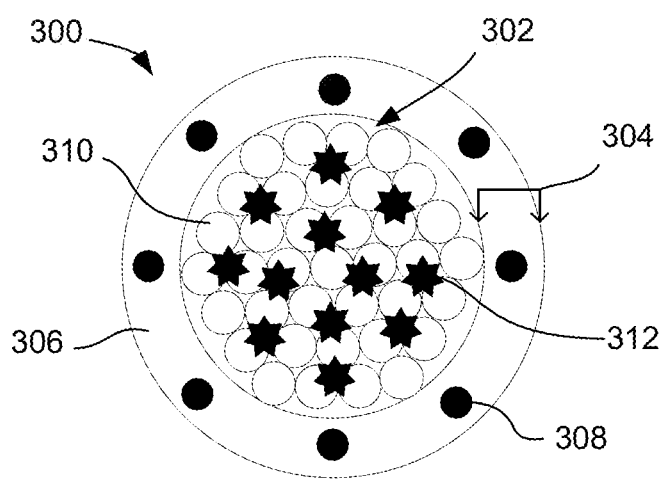
FIG. 3 schematically displays yet another example of a particulate build material for three-dimensional printing in accordance with examples of the present disclosure.

With respect to the particulate core, the particulate core can be a metal, a ceramic, or a combination of both. When the particulate core includes at least one metal and at least one ceramic, for example, the metal and ceramic materials may be blended into a single composition or may exist as separate and distinct particles within the core. For example, the structure shown in FIG. 1 can blended with some core structures including a ceramic and a metal. Alternatively, as shown in FIG. 3, the particulate build material for 3D printing 300 can include a particulate core 302 including a metal 310 and a ceramic material 312. The particulate core is surrounded by a photosensitive coating 304 including a polymer 306 with a photosensitive agent 308 suspended therein. In certain examples, by using both types of core, there can be a blend of individually coated metal core particles and individually coated ceramic core particles.

In one aspect, as mentioned, the particulate core can include a metal. A core including a metal can be a single metal, an alloy thereof, or a combination thereof. In one example, the metal core can include antimony, chrome, nickel, steel, stainless steel, titanium, tin, gold, silver, bronze, aluminum, copper, platinum, zinc, lead, alloys thereof, or combinations thereof. In another example the metal core can include steel, stainless steel, titanium, gold, silver, bronze, aluminum, copper, alloys thereof, or combinations thereof. In yet another example, the metal core can include aluminum. In a further example, the metal core can include stainless steel.

In another aspect, the particulate core can include a ceramic. A core including a ceramic can be a single ceramic or a combination of ceramics. In one example, the ceramic core can include an oxide, a nitride, or a carbide ceramic. In another example, the ceramic core can include aluminum oxide, dense and nonporous aluminum oxides, porous aluminum oxides, aluminum-calcium-phosphorus oxides, bioglasses, boron nitride, boron carbide, borosilicate glass, calcium aluminates, calcium carbonate, calcium sulfates, ceravital, corals, ferric-calcium-phosphorus oxides, glass fibers and their composites, glasses, dense and nonporous glasses, hydroxyapatites, dense hydroxyapatites, pyrolitic carbon-coated devices, silica, silicon boride, silicon oxide, silicon nitride, silicon carbide, soda lime glass, titanium oxide, titanium nitride, tri calcium phosphate, tungsten carbide, tungsten disilicide, zinc-calcium-phosphorus oxides, zinc sulfate-calcium-phosphorus oxides, zinc oxide, zirconia, or combinations thereof. In one example, the ceramic core includes silica.

In a further aspect, the particulate core can be at least one metal and at least one ceramic. The at least one metal and the at least one ceramic material can be selected from any member of the metal core materials and ceramic core materials previously identified. In one example, a particulate core including at least one metal and at least one ceramic can include cobalt mixed with a tungsten carbide ceramic. Other combinations are also contemplated.

The size of the particulate core can vary based on the desired level of detail for the printed object. Printed objects having greater detail may require a smaller particulate build material for the print medium. In one example, the particulate core can range from about 1 μm to about 1 mm. In another example, particulate core can range from about 1 μm to about 100 μm in size. In yet another example, the particulate core can range from about 1 μm to about 50 μm in size, or from about 10 μm to about 100 μm in size.

Turning now to the photosensitive coating, this coating can be applied to an outer shell or surface of the particulate core, whether it is a single particle core or a multi-particle core. The coating can be at any desired thickness that provides a desirable function or outcome. In one example, the photosensitive coating can have an average thickness ranging from about 5 nm to about 500 nm. Thus, once coated on the particle core, the particle size of the particulate build material, on average, can increase by about 10 nm to 1 μm, for example. In another example, the coating can have an average thickness ranging from about 50 nm to about 400 nm. In yet another example, the photosensitive coating can have an average thickness ranging from about 100 nm to about 300 nm.

As mentioned, the photosensitive coating can include a polymer having a photosensitive agent suspended or attached therein. The polymer can include any polymer that has a melting point lower than a melting point of the particulate core. In one example, the polymer can include a member selected from polyacetate, polyamide, polyurethane, polypropylene, polyethylene, polyvinyl chloride, polyacetyl, polystyrene, poly(N-methylmethacrylamides), polymethyl methacrylate, polyolefin, polyimide, polysulphone, polyvinylidene flouride, polyether ketones, polyester, polystyrene, styrene-acrylic copolymers, polylactic acid, polycarbonate, N-trimethoxysilyl propyl methacrylates, or combinations thereof. In another example, the polymer includes a member selected from polyamides, polyurethanes, polyesters, styrene-acrylic copolymers, polylactic acids, polycarbonates, or combinations thereof. In one example, the polymer includes a polystyrene latex.

In some examples, the polymer in the photosensitive coating can be doped with a doping agent. The doping agent can include carbon black, graphite, carbon nantotubes, a carbon material, or a combination thereof. In another example the doping agent can include a nanoparticle of conductive materials, semi-conductive materials, ferromagnetic materials, ferroelectic materials, or combinations thereof. In yet another example, the doping agent can include a polar organic material or a fatty acid. In one example, the doping agent can include from about 1 wt % to about 20 wt % of the photosensitive coating. In another example, the doping agent can include from about 3 wt % to about 12 wt % of the photosensitive coating. In yet another example, the doping agent can include from about 5 wt % to about 10 wt % of the photosensitive coating.

The photosensitive agent can be suspended within or attached to the polymer in any amount that allows for the polymer to soften and adhere to adjacent particulates when energized by a frequency or frequency range of photo energy. In one aspect, the photosensitive agent can include from about 0.1 wt % to about 20 wt % of the photosensitive coating. In another aspect, the photosensitive agent can include from about 1 wt % to about 20 wt % of the photosensitive coating. In yet another aspect, the photosensitive agent can include from about 5 wt % to about 15 wt % of the photosensitive coating. In yet another aspect, the photosensitive agent can include from about 7 wt % to about 10 wt % of the photosensitive coating. In a further aspect, the photosensitive agent can include from 0.1 wt % to 5 wt % of the photosensitive agent. In some examples, the photosensitive agent can add color to the photosensitive coating.

In one example, the photosensitive agent can include photosensitive functional groups attached to the polymer or a photoresist polymer. Exemplary photosenstive functional groups can include photosenstive: azo, ester, ether, amide, imide, amine, imine, carbonate, carbamate, thio-ether, thio-ester, isocyanides, or combinations thereof.

In another example, the photosensitive agent can include an antenna dye. Antenna dyes absorb light at a particular wavelength. Exemplary antenna dyes can include members selected from aluminum quinoline complexes, porphyrins, porphins, indocyanine dyes, phenoxazine derivatives, phthalocyanine dyes, napthalocyanines, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, or combinations thereof.

In one aspect, the antenna dye can absorb light in the infrared spectrum. Exemplary antenna dyes suitable for use with photo energy sources in the infrared spectrum can include a member selected from polymethyl indoliums, metal complex IR dyes, indocyanine green, polymethine dyes such as pyrimidinetrione-cyclopentylidenes, guaiazulenyl dyes, croconium dyes, cyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, or combinations thereof.

In some aspect, the antenna dye can absorb a wavelength range from about 600 nm to about 720 nm. Non-limiting examples of antennae dye for use in this range of wavelengths can include indocyanine dyes such as 3H-indolium, 2-[5-(1,3-dihydro-3,3-dimethyl-1-propyl-2H-indol-2-ylidene)-1-,3-pentadienyl]-3,3-dimethyl-1-propyl-,iodide) ($\lambda$ max 642 nm), 3H-indolium, 1-butyl-2-[5-(1-butyl-1,3-dihydro-3,3-dimethyl-2H-indol-2-ylidene)-1,3-pentadienyl]-3,3-dimethyl-,perchlorate (683 $\lambda$ max 642 nm), and phenoxazine derivatives such as phenoxazin-5-ium,3,7-bis(diethylamino)-,perchlorate ($\lambda$ max=645 nm), phthalocyanine dyes such as silicon 2,3-napthalocyanine bis(trihexyl-silyloxide) and matrix soluble derivatives of 2,3-napthalocyanine, matrix soluble derivatives of silicon phthalocyanine, matrix soluble derivatives of benzophthalocyanines, or combinations thereof.

In one aspect, the antenna dye can absorb a wavelength range from about 300 nm to about 600 nm. Non-limiting examples of antennae dyes for use in this range of wavelengths can include aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-on-e disodium salt ($\lambda$ max=400 nm); ethyl 7-diethylaminocoumarin-3-carboxylate ($\lambda$ max=418 nm); 3,3'-diethylthiacyanine ethylsulfate ($\lambda$ max=424 nm); 3-allyl-5-(3-ethyl-4-methyl-2-thiazolinylidene) rhodanine ($\lambda$ max=430 nm), or combinations thereof.

In some aspects, the particulate build material for 3D printing can include a second plurality of particulates which includes a second particulate core having a second photosensitive coating applied to the second particulate core. The second particulate core can include, for example, a metal, a ceramic, or both a metal and a ceramic. The second photosensitive coating can include a second polymer having a second photosensitive agent suspended or attached therein. In this example, one or more of the second particulate core, the second polymer, or the second photosensitive agent can be different than the particulate core, the polymer, or the photosensitive agent, respectively.

Figure 4:
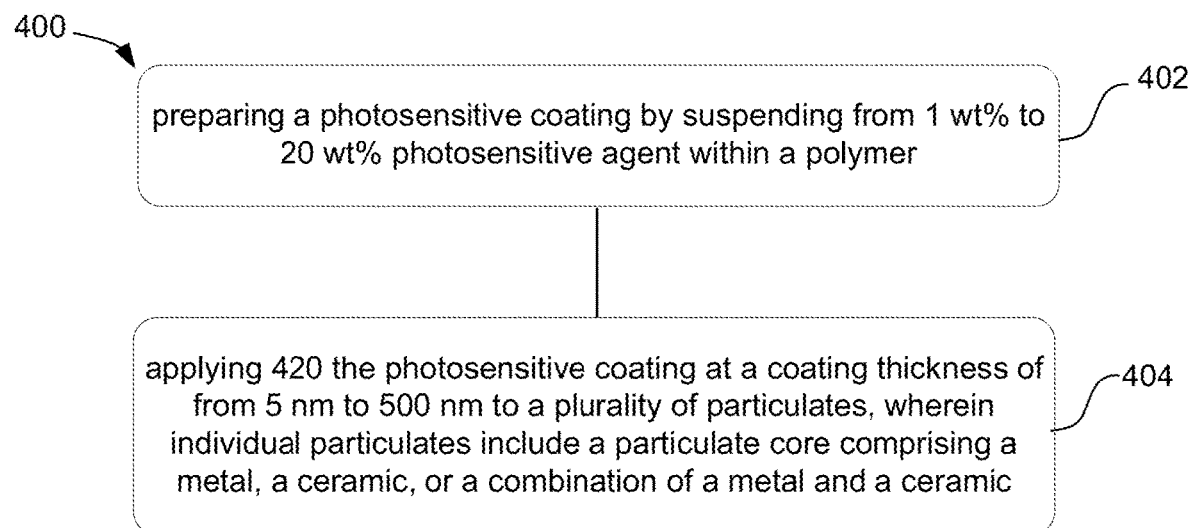
FIG. 4 graphically shows a method of making a particulate build material for three-dimensional printing in accordance with examples of the present disclosure.

In additional detail regarding the methods described herein, FIG. 4 depicts an exemplary method 400 of making a particulate build material. The method can include preparing 410 a photosensitive coating by suspending from 0.1 wt % to 20 wt % photosensitive agent within a polymer; and applying 420 the photosensitive coating at a coating thickness of from 5 nm to 500 nm to a plurality of particulates, wherein individual particulates include a particulate core including a metal, a ceramic, or a combination of a metal and a ceramic. In certain examples, the plurality of particulates includes both metal and ceramic particles coated, such that when applying the photosensitive coating, the metal and ceramic are within a common coating, separate coatings, or both.

In some examples, the method can further include milling a plurality of particulates before coating the individual particulate cores with the photosensitive coating. In another example, the method can further include creating a slurry of particulates in order to form a particulate core through spray drying that is larger than the particulates in the slurry. In yet another example, the method can further include melting a material and spraying the material through a nozzle to create uniform sized particulate cores. In some examples, this process can be done under a vacuum. In a further example, the method can further include a drying the photosensitive coating after application to the plurality of particulates. In yet other examples, the method can include allowing the photosensitive coating to cool.

Figure 5:
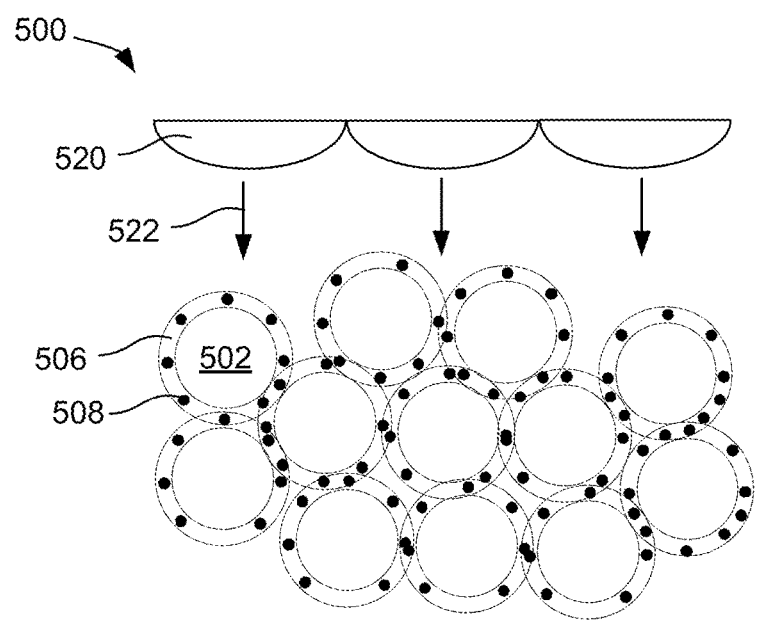
FIG. 5 schematically displays a system for three-dimensional printing where a photo energy source applies photo energy to particulate build material in accordance with examples of the present disclosure.

As also mentioned, and as shown schematically in FIG. 5, a system 500 for three-dimensional printing can include the particulate build material for three-dimensional printing described herein, e.g., with a particulate core 502, a polymer 506 with a photosensitive agent 508 dispersed or entrapped therein, along with a photo energy source 520 for emitting photo energy 522 to the particulate build material. The photosensitive agent can absorb photo energy corresponding to a frequency of the photo energy such that the photosensitive agent causes the polymer to soften and adhere to adjacent particulates. The particulate cores and photosensitive coatings can be as described above. In some embodiments, the system can further include a heat source to fuse adjacent particulate cores together.

Turning to the photo energy source 520. In one example, the photo energy source can be a laser, a lamp, an array of LEDs, or a flame. In another example, the photo energy source can be natural light that can be separated or directed using a prism and/or a reflective surface. In one example, the photo energy source can emit photo energy in the UV spectrum. In another example, the photo energy source can emit photo energy in the IR spectrum. In still another example, the photo energy source can emit photo energy in the visible spectrum. In yet another example, the photo energy source is a combination of those spectra previously identified. In some examples, the system can further include a lens and/or a condenser to direct the photo energy.

In a further example, once the photo energy is used to soften the polymer to adhere the coatings of adjacent particles together, typically, this is a temporary physical bonding that is used to hold the part together long enough for the sintering step or some other type of heat fusion to take place where the particulate cores are sintered/fused together. Thus, the system can also include a heat or other energy source that is sufficient to scanter the metal and/or ceramic cores together.

It is noted that, as used in this specification and the appended claims, the singular forms "a," "an," and "the" include plural referents unless the content clearly dictates otherwise.

As used herein, the term "visible" in the context of light refers to light (electromagnetic energy) having wavelengths in the range of 400-700 nm.

As used herein, the term "infrared (IR)" refers to light having wavelengths in the range of 700-10,000 nm.

The term "antenna" refers to a light-absorbing compound that is selected for its ability to absorb at a predetermined wavelength or in a predetermined wavelength range. The antenna readily absorbs a desired wavelength of radiation, and transfers energy to the surrounding polymer.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 0.1 wt % to about 20 wt % should be interpreted to include not only the explicitly recited limits of about 0.1 wt % and about 20 wt %, but also to include individual weights such as 0.5 wt %, 1 wt %, 2 wt %, 11 wt %, 14 wt %, and sub-ranges such as 10 wt % to 20 wt %, 5 wt % to 15 wt %, etc.

EXAMPLES

The following examples illustrate particulate build materials for three-dimensional printing. However, it is to be understood that the following are only exemplary or illustrative of the application of the materials and methods disclosed herein. Numerous modifications and alternative methods may be devised by those skilled in the art without departing from the spirit and scope of the present disclosure. The appended claims are intended to cover such modifications and arrangements.

Example 1—Particulate Build Material for 3D Printing Including a Ceramic Core A polystyrene latex particle with a silica core is prepared using silica particles. Silica particles can be directly synthesized by the Stober process in an aqueous ethanol medium. The particles can then be coated with 3-(trimethoxysilyl)propyl methacrylate (MPS) with a photosensitizer entrapped therein. The polymer encapsulation of the silica particles can occur by dispersion polymerization of styrene in aqueous ethanol medium with poly(N-vinyl pyrrolidone) (PVP) as stabilizer along with a polymethine dye as the photosensitive agent. This process results in a polystyrene latex coating having a polymethine dye, which surrounds a silica particle or a cluster of silica particles, depending on the size of the silica used. In some examples, smaller particles may be more like coated in clusters rather than as single particles.

Example 2—Particulate Build Material for 3D Printing Including a Metal Core

Metal particles can be encapsulated by employing liquid-phase deposition of polymers. Poly(methyl methacrylate) containing porphyrin is dissolved in a low-boiling point solvent and mixed with metal powdered aluminum to form a two-phase mixture. A high-boiling point solvent is then added to the mixture. The mixture is heated to remove the low boiling point solvent and deposit the polymer with the porphyrin photosensitive agent on the surface of the aluminum particles. This yields a precipitate of the polymer with photosensitive agent on the surface of metal aluminum particles.

Example 3—Particulate Build Material for 3D Printing Including a Combination of Ceramic and Metal Core A ceramic core as described in Example 1 and a metal core as described in Example 2 can be admixed at a 1:1 weight ratio and coated with 3-(trimethoxysilyl)propyl methacrylate (MPS) with a photosensitizer entrapped therein. The polymer encapsulation of the ceramic and metal core material can occur by dispersion polymerization of styrene in aqueous ethanol medium with poly(N-vinyl pyrrolidone) (PVP) as stabilizer along with a polymethine dye as the photosensitive agent. This process results in a polystyrene latex coating having a polymethine dye, which surrounds individual particles or clusters of combined ceramic and metal particles, depending on the size of the core material particles used. In some examples, smaller particles may be more likely coated in mixed-core clusters rather than as single particles.

Example 4—Particulate Build Material for 3D Printing Including a Combination of Ceramic and Metal Core A ceramic core as described in Example 1 and a metal core as described in Example 2 can be admixed at a 1:2 weight ratio and encapsulated by employing liquid-phase deposition of polymers. Poly(methyl methacrylate) containing porphyrin is dissolved in a low-boiling point solvent and mixed with metal powdered aluminum and silica to form a multi-phase mixture. A high-boiling point solvent is then added to the mixture. The mixture is heated to remove the low boiling point solvent and deposit the polymer with the porphyrin photosensitive agent on the surface of the core particles. This yields a precipitate of the polymer with photosensitive agent on the surface of particles. This process results in a porphyrin-doped polymer coating, which surrounds individual particles or clusters of combined ceramic and metal particles, depending on the size of the core material particles used. In some examples, smaller particles may be more likely coated in mixed-core clusters rather than as single particles.

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A particulate build material, comprising a plurality of particulates, wherein individual particulates comprise a particulate core having a photosensitive coating applied to a surface of the particulate core, the particulate core comprises a metal, a ceramic, or both a metal and a ceramic, and wherein the photosensitive coating comprises a polymer having from 5 wt % to 15 wt % of a photosensitive agent suspended or attached therein.

2. The particulate build material of claim 1, wherein the particulate core is the metal and includes antimony, chrome, nickel, steel, stainless steel, titanium, tin, gold, silver, bronze, aluminum, copper, platinum, zinc, lead, alloys thereof, or combination thereof.

3. The particulate build material of claim 1, wherein the particulate core is the ceramic and includes aluminum oxide, dense and nonporous aluminum oxides, porous aluminum oxides, aluminum-calcium-phosphorus oxides, bioglasses, boron nitride, boron carbide, borosilicate glass, calcium aluminates, calcium carbonate, calcium sulfates, ceravital, corals, ferric-calcium-phosphorus oxides, glass fibers and their composites, glasses, dense and nonporous glasses, hydroxyapatites, dense hydroxyapatites, pyrolitic carbon-coated devices, silica, silicon boride, silicon oxide, silicon nitride, silicon carbide, soda lime glass, titanium oxide, titanium nitride, tri-calcium phosphate, tungsten carbide, tungsten disilicide, zinc-calcium-phosphorus oxides, zinc sulfate-calcium-phosphorus oxides, zinc oxide, zirconia, or combination thereof.

4. The particulate build material of claim 1, wherein the particulate core comprises both the metal and the ceramic.

5. The particulate build material of claim 1, wherein the particulate core is from 10 μm to about 100 μm in size.

6. The particulate build material of claim 1, wherein the polymer comprises polyacetate, polyamide, polyurethane, polypropylene, polyethylene, polyvinyl chloride, polyacetyl, polystyrene, poly(N-methylmethacrylamides), polymethyl methacrylate, polyolefin, polyimide, polysulphone, polyvinylidene flouride, polyether ketones, polyester, polystyrene, styrene-acrylic copolymers, polylactic acid, polycarbonate, N-trimethoxysilyl propyl methacrylates, or combinations thereof.

7. The particulate build material of claim 1, wherein the photosensitive coating comprises from 5 wt % to 15 wt % of the photosensitive agent and is selected from the group consisting of aluminum quinoline complexes, porphyrins, porphins, indocyanine dyes, phenoxazine derivatives, phthalocyanine dyes, napthalocyanines, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, or combinations thereof.

8. The particulate build material of claim 1, further comprising a second plurality of particulates which includes a second particulate core having a second photosensitive coating applied to the second particulate core, wherein the second particulate core comprises a metal, a ceramic, or both a metal and a ceramic, and wherein the second photosensitive coating comprises a second polymer having a second photosensitive agent suspended or attached therein, wherein one or more of the second particulate core, the second polymer, or the second photosensitive agent is different than the particulate core, the polymer, or the photosensitive agent, respectively.

9. The particulate build material of claim 1, wherein the photosensitive agent is a photosensitive functional group on the polymer.

10. The particulate build material of claim 9, wherein the photosensitive functional group is functional group selected from an azo, ester, ether, amide, imide, amine, imine, carbonate, carbamate, thio-ether, thio-ester, isocyanides, or combinations thereof.

11. A method of making the particulate build material of claim 1, comprising:
preparing a photosensitive coating by suspending or attaching from 5 wt % to 15 wt % photosensitive agent within a polymer;
and applying the photosensitive coating at a coating thickness of from 5 nm to 500 nm to a plurality of particulates, wherein individual particulates include a particulate core comprising a metal, a ceramic, or a combination of a metal and a ceramic;
thereby producing the particulate build material of claim 1.

12. The method of claim 11, further comprising milling the plurality of particulates before coating with the photosensitive coating.

13. The method of claim 11, wherein the plurality of particulates include both metal and ceramic particles coated, such that when applying the photosensitive coating, the metal and ceramic are within a common coating, separate coatings, or both.

14. The method of claim 11, further comprising drying the photosensitive coating after application to the plurality of particulates.

15. A system for three-dimensional printing, comprising:
a particulate build material for three-dimensional printing including a plurality of particulates, wherein individual particulates comprise a particulate core having a photosensitive coating applied to a surface of the particulate core, the particulate core comprises a metal, a ceramic, or both a metal and a ceramic, and wherein the photosensitive coating comprises a polymer having from 5 wt % to 15 wt % of a photosensitive agent suspended or attached therein, and a photo energy source to emit photo energy to the particulate build material, wherein the photosensitive agent absorbs energy corresponding to a frequency of the photo energy such that the photosensitive agent causes the polymer to soften and adhere to adjacent particulates.

16. The system of claim 15, further comprising a heat source or second photo energy source to fuse adjacent particulate cores together after the adjacent particles are adhered together by polymer softening.

17. The system of claim 15, wherein the photo energy is UV light, visible light, IR, or a combination thereof.

* * * * *